United States Patent
Dong et al.

(10) Patent No.: US 8,208,222 B2
(45) Date of Patent: Jun. 26, 2012

(54) SLIDER BODY WITH SELECTIVE HARD COMPONENT REMOVAL

(75) Inventors: Ying Dong, Eden Prairie, MN (US); Feng Wang, Eden Prairie, MN (US); Ki Myung Lee, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 407 days.

(21) Appl. No.: 12/489,210

(22) Filed: Jun. 22, 2009

(65) Prior Publication Data

US 2010/0321830 A1    Dec. 23, 2010

(51) Int. Cl.
*G11B 5/60* (2006.01)
(52) U.S. Cl. .................................................. 360/235.1
(58) Field of Classification Search ..... 360/235.1–235.3
See application file for complete search history.

(56) References Cited

U.S. PATENT DOCUMENTS

| | | | |
|---|---|---|---|
| 4,893,204 A | 1/1990 | Yamada et al. | |
| 6,362,935 B1 | 3/2002 | Rich | |
| 6,366,429 B1 | 4/2002 | Stover et al. | |
| 6,525,909 B1 | 2/2003 | Qian et al. | |
| 6,526,909 B1 | 3/2003 | Grannen et al. | |
| 6,529,347 B2 | 3/2003 | Hipwell et al. | |
| 6,534,425 B1 | 3/2003 | Karr et al. | |
| 6,603,639 B1 | 8/2003 | Polycarpou et al. | |
| 6,611,400 B1 | 8/2003 | Polycarpou et al. | |
| 6,683,753 B1 * | 1/2004 | Lille | 360/235.1 |
| 6,882,505 B2 | 4/2005 | Sasaki et al. | |
| 6,926,582 B2 | 8/2005 | Beckle et al. | |
| 6,995,952 B2 | 2/2006 | Feliss et al. | |
| 7,038,884 B2 | 5/2006 | McNeill et al. | |
| 7,072,146 B2 | 7/2006 | Tokuyama et al. | |
| 7,308,753 B2 | 12/2007 | Sasaki et al. | |
| 7,381,670 B2 * | 6/2008 | Sugiura et al. | 501/87 |
| 2006/0077592 A1 | 4/2006 | Etoh et al. | |

* cited by examiner

*Primary Examiner* — Allen Heinz
(74) *Attorney, Agent, or Firm* — Kagan Binder, PLLC

(57) ABSTRACT

A slider is formed of a two-phase material having a first component and a second component that is harder than the first component. A media-facing surface is formed on two-phase material, with a leading edge extending transversely from the media-facing surface. The second component is selectively removed from the two-phase material in a contact region located along at least one of the leading edge and the media-facing surface, such that a hardness of the slider is reduced in the contact region.

15 Claims, 5 Drawing Sheets

SLIDER BODY WITH SELECTIVE HARD COMPONENT REMOVAL

BACKGROUND

Media-based data storage systems such as magnetic disc drives utilize a wide variety of slider designs. In magnetic data heads, for example, a suspension assembly and actuator are used to position a slider with a transducer or read/write head over a rotating disc or other data storage medium, in order to read and write sequential bit patterns on data tracks defined along the tracking direction of the disc medium. In test heads and media glide heads, the slider is adapted for testing, formatting, calibrating or defect screening of the media. Additional slider designs are configured for use with other forms of media, including digital and analog tape heads, optical data storage heads, and FRAM or FeRAM-based (ferroelectric random access memory) devices.

In disc-based data storage systems, translation of the magnetic medium generates windage along the slider body, causing the media-facing surface to become air-bearing. The slider flies above the medium on the air-bearing surface (ABS), reducing wear and tear as compared to contact-based technologies. The fly height and slider attitude must be carefully regulated, however, in order to provide optimal performance, and precise actuator and suspension control is required to avoid slider-media contact.

Contact events typically occur during disc startup and shutdown, or due to power loss, mechanical malfunction, physical shock and vibrations. To address this problem, a landing zone or contact start/stop (CSS) area is sometimes defined in a data-free section of the medium, for example along the inner diameter (ID) of a magnetic disc. The slider is positioned in the CSS area during startup/shutdown, and in the event of unexpected power loss or shock-related events, typically using a spring mechanism or the rotational inertia of the disc to position the slider. Often, the CSS is provided with laser-zone texturing (LZT) or other surface features to reduce friction and stiction (static friction) on restart.

Alternatively, a load/unload (L/UL) system is used to lift the slider off the storage medium when not in use. The L/UL approach reduces friction, stiction and other wear effects by relocating the head to an unload area or L/UL ramp, which is located off the data storage medium. L/UL techniques also provide "green drive" features by allowing the head to be parked on the L/UL ramp during idling, and facilitate system-level active protection systems using acoustic transducers and accelerometers or g-sensors to control L/UL operations when the disc drive (or the computer system containing the disc drive) is subject to shock or vibration.

Even in advanced CSS and L/UL designs, however, the risk of slider-media contact remains. This is particularly true, for example, when the disc system is dropped or struck, or when slider attitude and position are not optimally controlled during load/unload events. Thus there remains a constant need for improved slider designs that reduce the potential risk and severity of media contact events, and which are adaptable to a wide range of disc drives and other non-volatile data storage systems.

SUMMARY

This invention is directed to a slider for use with a data storage medium. The slider is formed of a two-phase material having a first component and a second component, where the second component is harder than the first component. A media-facing surface is formed on the two-phase material, with a leading edge extending transversely from the media-facing surface. The second component is selectively removed from the two-phase material, such that hardness of the slider body is reduced in a contact region located along at least one of the media-facing surface and the leading edge.

DETAILED DESCRIPTION

Figure 1:
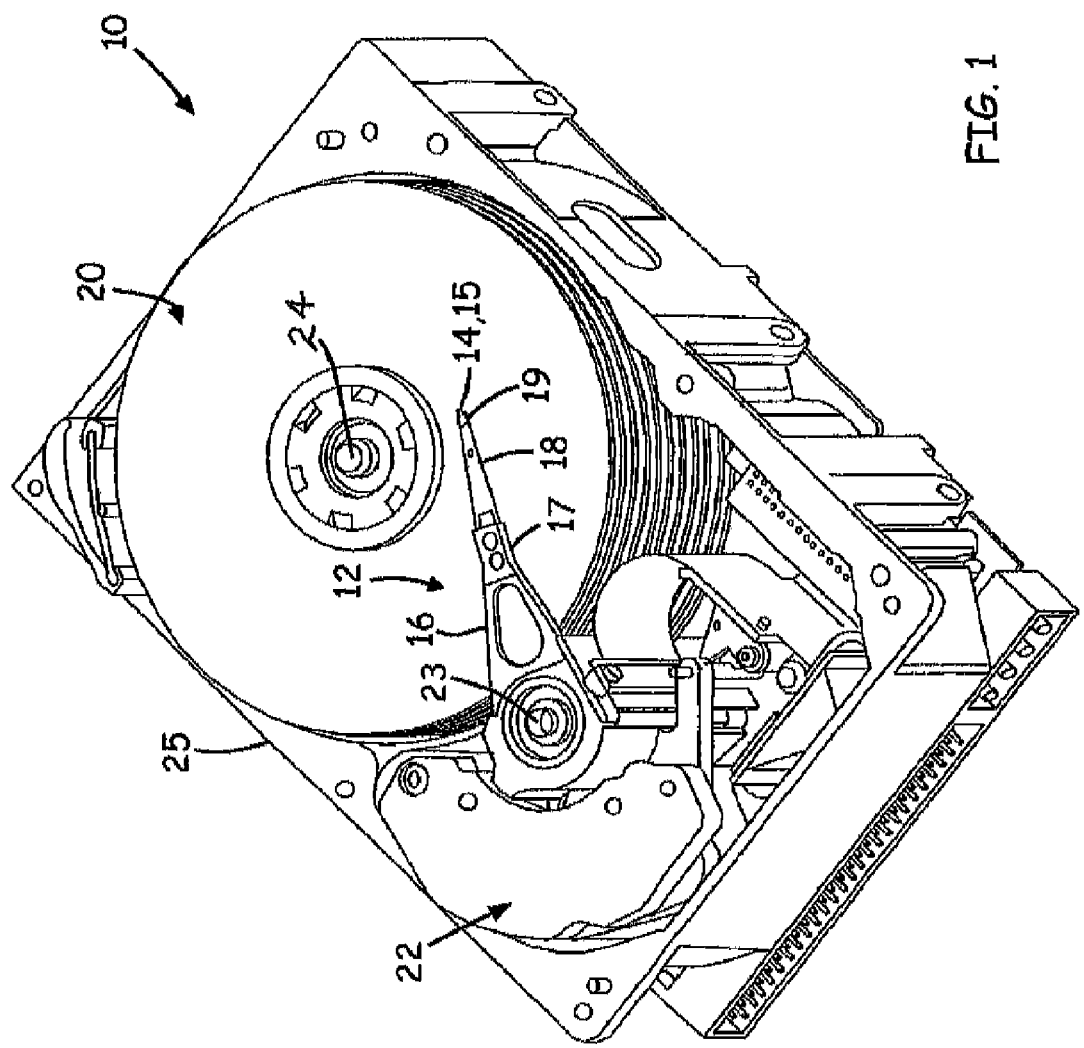
FIG. 1 is a perspective view of a magnetic recording system having an actuator for positioning a slider with respect to a data storage medium.

FIG. 1 is a perspective view of data storage system 10 with magnetic data storage medium 20. In this particular embodiment, system 10 comprises a disc drive with actuator assembly 12 for positioning slider 14 with magnetic transducer 15 in order to perform read and write operations on disc-based magnetic storage medium 20.

Actuator 12 comprises actuator arm 16 and a suspension with baseplate/mounting block 17, load beam 18 and flexure 19. Load beam 18 is connected to actuator arm 16 at baseplate/mounting block 17, and supports slider 14 on flexure 19. A magnetic disc (alternatively, a stack of parallel and coaxial discs) rotates about spindle axis 24 within housing 25, translating storage medium 20 with respect to slider 14. Voice coil motor 22 rotates actuator arm 16 about spindle axis 23, positioning slider 14 and transducer 15 with respect to the various data storage tracks defined along medium 20.

Transducer 15 writes magnetic data in the form of sequential bits, which are defined by magnetization domains in medium 20. The domains have a bit length defined along the tracking direction, which determines the linear bit density in bits per inch (BPI), and a bit width defined in the crosstrack direction, which determines the track density in tracks per inch (TPI). The total areal density is given by the product of linear densities TPI and BPI, and is given in bits per square inch. Alternatively, metric units are used, such as tracks per cm and bits per cm or bits per $cm^2$.

Contact events occur when slider 14 comes into contact with data storage medium 20, for example during load/unload (L/UL) events, CSS positioning, power cycling, or when the disc drive or computer system is subject to shock, acceleration or vibration. When contact events occur, hard materials in the slider body tend to damage to the media surface, for example by scratching or abrading the media storage layer. Slider 14 is designed to reduce the risk of such damage by removing a hard component from the slider material, particularly along the leading edge or media-facing surface where slider 14 contacts medium 20.

Figure 2A:
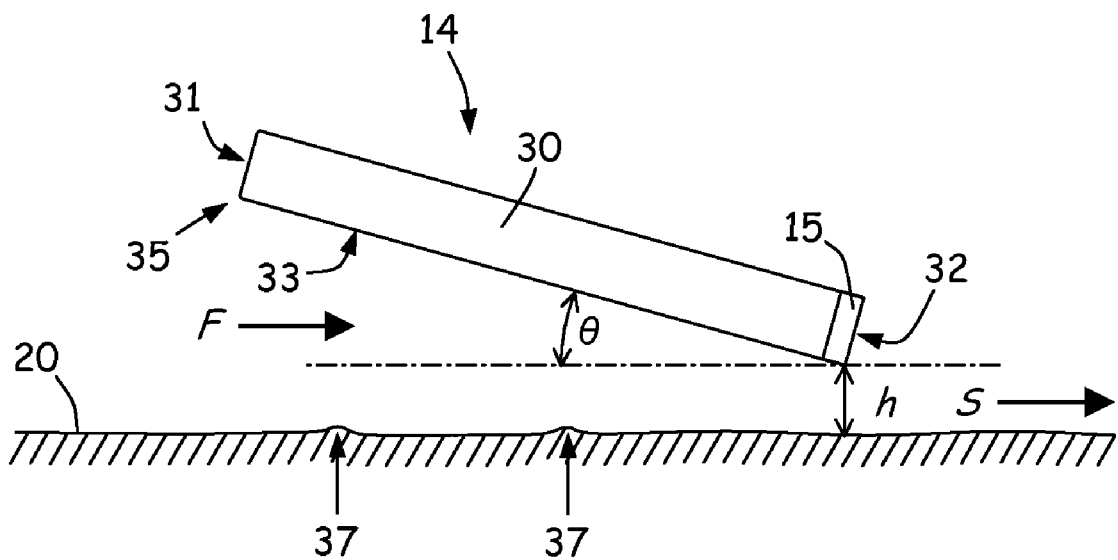
FIG. 2A is a schematic side view showing the slider in FIG. 1 with a positive pitch angle.

FIG. 2A is a schematic side view showing slider 14 with transducer 15 located above data storage medium 20, at positive pitch angle θ. Slider 14 comprises slider body 30 with leading edge 31 and trailing edge 32, as defined along tracking direction S of storage medium 20. Transducer 15 is located on trailing edge 32 of slider body 30.

As shown in FIG. 2A, slider 14 comprises a data head or read/write head (that is, a working head), with transducer 15 for read and write operations on data storage medium 20. Media-facing surface 33 is formed as an external surface on slider 14, and faces medium 20. Leading edge 31 extends transversely from media-facing surface 33 at corner interface 35, and media-facing surface 33 extends transversely from leading edge 31 between corner interface 35 and trailing edge 32. Trailing edge 32 also extends transversely from media-facing surface 33, opposite and generally parallel to leading edge 31.

Medium 20 is typically a magnetic storage medium such as a magnetic disc or magnetic tape, but in some embodiments slider 14 is configured for use with optical or FRAM/FeRAM-based (ferroelectric) media-based systems, or for use with other nonmagnetic media. Alternatively, slider 14 is configured as a test head, a media glide head or a burnishing head, and transducer 15 is replaced with corresponding components for testing, defect screening, calibration, formatting or other processing operations on medium 20.

In the particular example of disc-based magnetic storage systems with "fly head" designs, media-facing surface 33 is typically formed as an air-bearing surface (ABS). The ABS supports slider 14 by generating lift from windage flow F, which is produced by the translation of data storage medium 20 in tracking direction S. In fly head embodiments, the slider orientation and position are described by pitch angle θ and fly height h, as defined with respect to the surface of data storage medium 20.

As data storage medium 20 track past slider 14, fly height h and pitch angle θ are controlled to optimize the performance of head 15. In particular, pitch angle θ is controlled to generate the desired lift from windage flow F, and fly height h is controlled to maintain close separation between slider 14 and data storage medium 20, while avoiding contact with surface irregularities such as asperities 37.

Figure 2B:
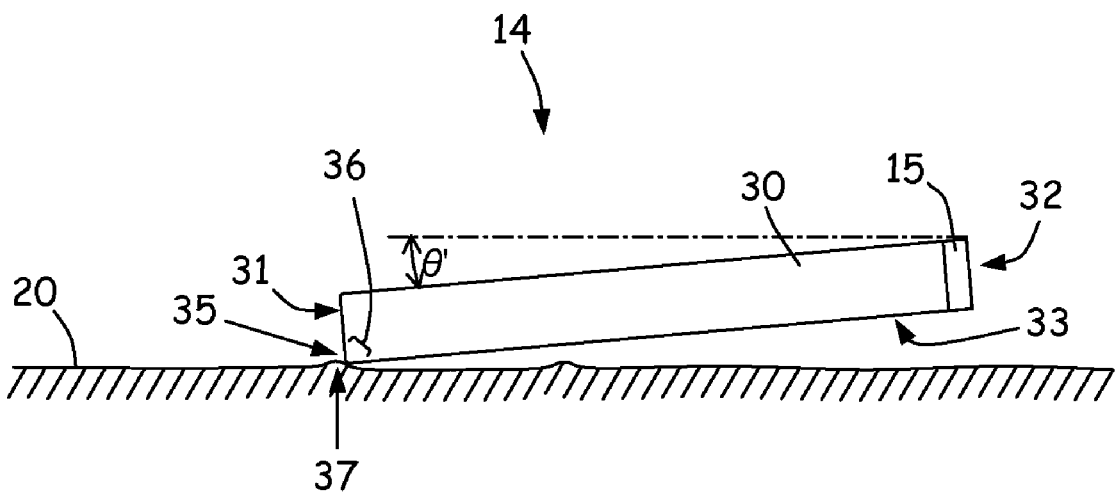
FIG. 2B is schematic side view showing the slider in FIG. 1 with a negative pitch angle and in contact with the data storage medium.

FIG. 2B is schematic side view showing slider 14 in contact with data storage medium 20. In this particular contact event, slider 14 has negative pitch angle θ'. Note, however, that FIGS. 2A and 2B are not to scale. In particular, the magnitude of fly height h and the relative dimensions of slider body 30 and asperities 37 are merely illustrative, and vary from embodiment to embodiment. In addition, pitch angle θ of FIG. 2A and pitch angle θ' of FIG. 2B are exaggerated with respect to their nominal range, which is typically on the order of a few degrees or less.

As opposed to fly pitch (FP) angle 74 as shown in FIG. 2A, above, pitch angle θ' is defined during L/UL operations and other static conditions, including a range of different contact events. As used herein, therefore, pitch angle θ' as shown in FIG. 2B is referred to as a pitch static angle (or PSA), and is used to describe the geometry of any slider-media contact, whether due to L/UL, startup, shutdown, power cycling, actuator malfunction, drive failure, or external effects such as acceleration, vibration and physical shock.

In typical operations, slider 14 is controlled such that pitch angles θ and θ' are positive. When slider 14 has negative pitch angle θ', there is an increased risk of contact-related damage to data storage medium 20, slider 14, or both. Under these conditions, the most likely region for slider-media contact (that is, contact region 36) is proximate corner interface 35, extending along one or both of leading edge 31 and media-facing surface 33. In particular, contact region 36 typically extends transversely from media-facing surface 33 along leading edge surface 31, and from leading edge surface 31 along media-facing surface 33. Depending on pitch angle and event geometry, however, contact region 36 is sometimes limited to one or the other of leading edge 31 and media-facing surface 33, particularly at corner region 35.

During contact events, data storage medium 20 is subject to scratching, shaving, "dinging," plastic deformation and other forms of damage, some resulting in the loss of data and storage area. Contact events also pose risks for slider 14, for example by generating mechanical stress in slider body 30 and head components such as transducer 15, or by abrading leading edge 31 and media-facing surface 33. Abrasion also liberates hard particles that can contaminate the surface of data storage medium 20, and may cause subsequent damage to transducer 15 or other active elements on slider body 30.

The effects of slider-media contact depend upon not only on event geometry and slider configuration, but also the particular materials used to form data storage medium 20 and slider body 30. Typical media materials include iron (Fe), cobalt (Co) and manganese (Mn) for magnetic media, aluminum (Al) and gold (Au) for reflective surfaces in optical media, and ferroelectric materials such as PZT (lead zirconate titanate) for FRAM or FeRAM-based media. A variety of metal, oxide and polymer materials are also commonly used for medium substrates and coatings.

Slider body 30 is typically formed of a two-phase substrate material with a host phase (a continuous phase) and an included phase (a discrete or discontinuous phase). In AlTiC embodiments, for example, the host phase is aluminum oxide ($Al_2O_3$) and the included phase is titanium carbonate (TiC).

For AlTiC and other two-phase substrates, the included phase is typically harder than the host phase, and typically harder than the surface material of data storage medium 20. In these embodiments, the included phase is also more difficult to etch, machine and mill, making it more likely to protrude above the softer host phase. Protrusions further increase the risk of slider-media contact, and the probability and severity of ensuing damage to data storage medium 20.

This issue is addressed by selectively removing the hard component of the two-phase substrate from slider body 30. In particular, the hard component is selectively removed from contact region 36, where slider body 30 is most prone to contact with data storage medium 20 during L/UL operations and other contact events. As a result, only the (relatively) softer component of the substrate is likely to come into media contact. That is, selective removal of the hard component reduces the hardness of slider body 30 in contact-prone region (s) 36, particularly along leading edge surface 31, media-facing surface 33, or both.

Figure 3A:
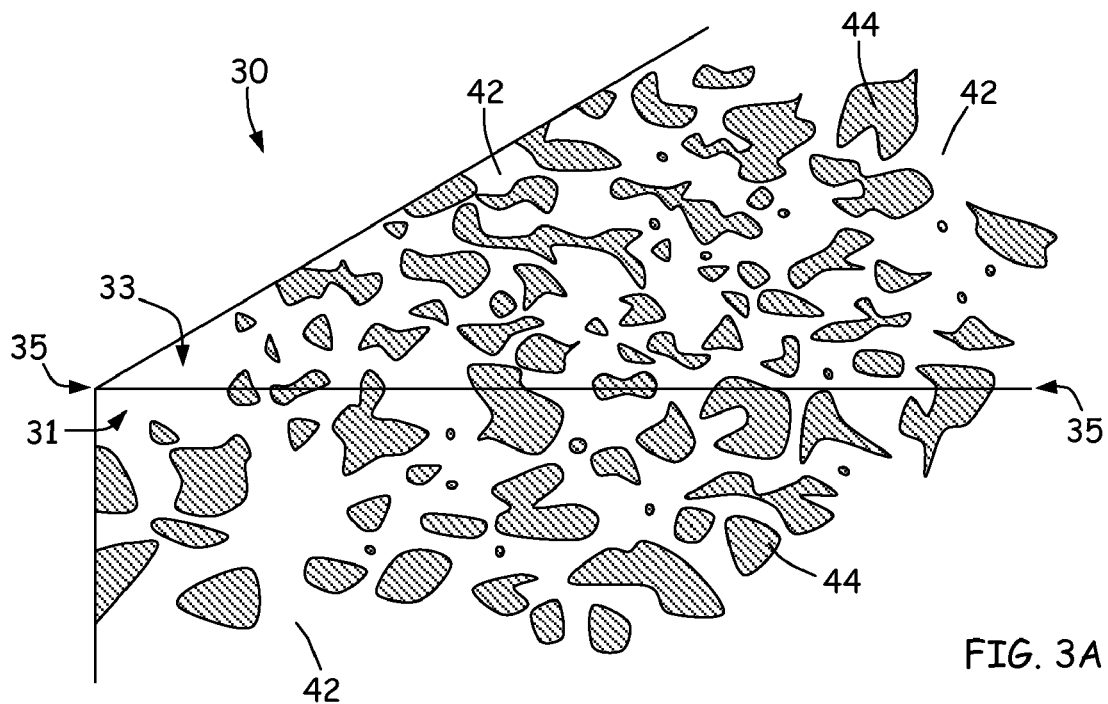
FIG. 3A is a perspective view the slider in FIG. 1, in an embodiment formed of a two-phase substrate having a relatively softer host phase and a relatively harder included phase.
Figure 3B:
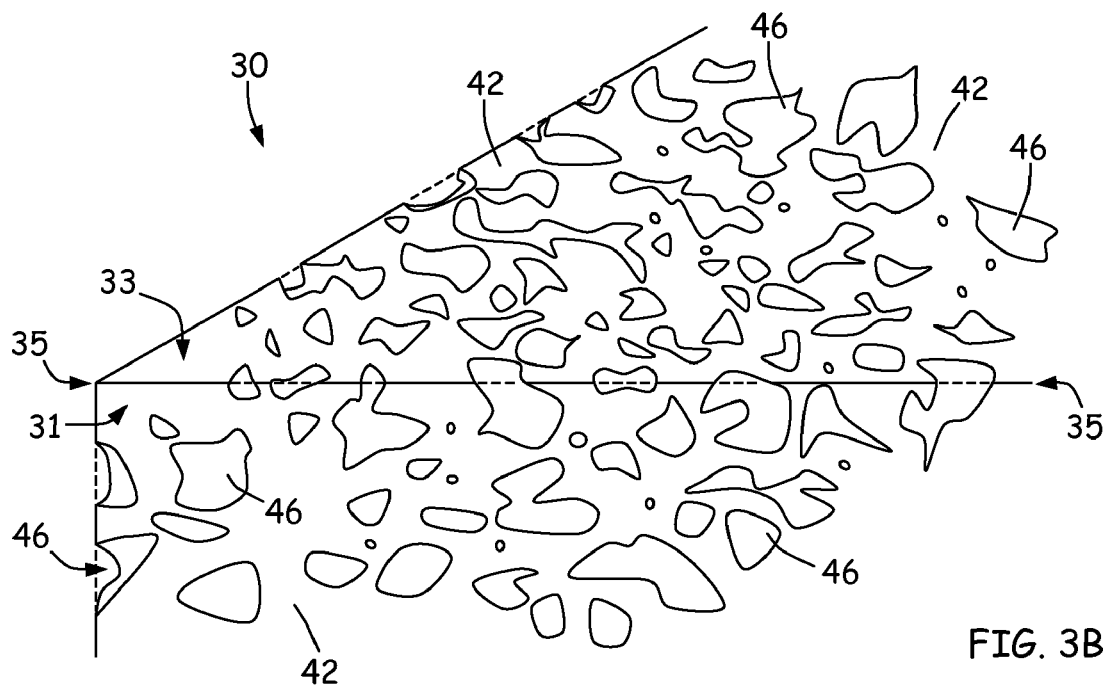
FIG. 3B is a perspective view of the slider in FIG. 3A, illustrating selective removal of the harder phase.

FIG. 3A is a perspective view of slider body 30, in an embodiment formed of a two-phase substrate having relatively soft host phase (or soft component) 42 and relatively hard included phase (hard component) 44. FIG. 3B is a perspective view of slider body 30, as shown in FIG. 3A, illustrating selective removal of included phase (hard component) 44. Note that slider body 30 is inverted with respect to FIGS.

2A and 2B, above, in order to show leading edge surface 31 and media-facing surface 33 at corner interface 35.

In the two-phase embodiments of FIGS. 3A and 3B, slider body 30 is formed of a continuous component (host phase 42) and a discrete or discontinuous component (included phase 44), where included phase 44 is relatively harder than host phase 42. Included phase 44 is removed from selected surfaces of slider body 30, as described above, such that the hard component is recessed from the selected region(s) of leading edge surface 31, media-facing surface 33 and corner interface 35, leaving voids 46 in host phase 42 as shown in FIG. 3B.

Because included phase 44 is relatively harder than host phase 42, selective removal reduces the hardness of slider body 30 in the contact region. In AlTiC-based embodiments, for example, host phase 42 ($Al_2O_3$) has a hardness of about 2,100 kG/mm² (20.6 GPa) and included phase 44 (TiC) has a hardness of about 3,200 kG/mm² (31.4 GPa), such that selective removal of host phase 42 reduces the hardness of slider body 30 to less than 30 GPa in the contact region. In similar embodiments, host phase 42 has a hardness between about 15 GPa and about 25 GPa and included phase 44 has a hardness between about 25 GPa and about 37 GPa, such that selective removal of included phase 44 reduces the hardness of slider body 30 to less than about 25 GPa in the contact region.

Typically, included phase 44 is selectively removed by chemical etching of the selected regions on slider body 30, using an etching agent that selectively reacts with the exposed portions of included phase 44. The reactants are then removed from host phase 42, leaving voids 46. In some embodiments, techniques such as reactive ion etching (RIE) are used, in which the etching agent is an ionic chemical agent such as $CF_4$.

The etching depth depends upon a number of factors including, but not limited to, etching agent, etching temperature, etching time, and the size and depth of the included phase domains that are removed. In some embodiments, the etching depth (or recess depth) ranges from about 5 nm to about 50 nm. In other embodiments, the etching depth is greater than 50 nm, and reaches about 100 nm to about 150 nm.

Typically, the etching process removes exposed portions of included phase 44. In these embodiments, the included phase is substantially absent within the etching depth of the selected surface region(s), except where it is covered by host phase 42, such that unexposed regions (inclusion) remain, as shown below.

Figure 4A:
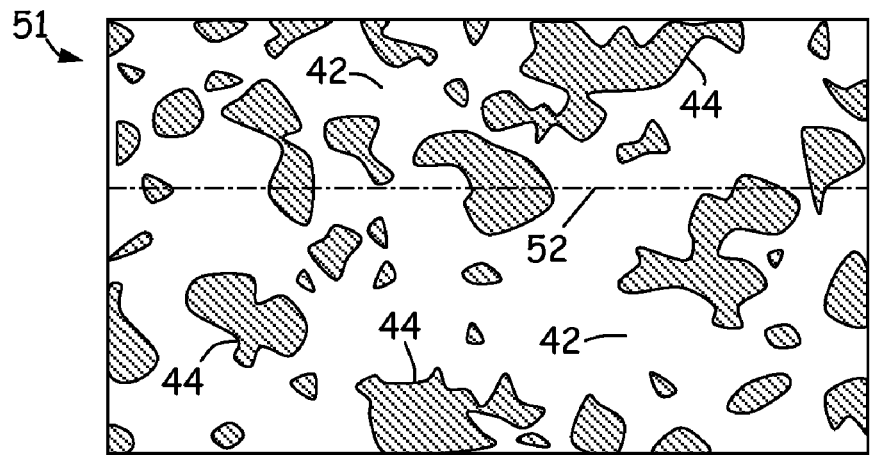
FIG. 4A is a two-dimensional view illustrating selective removal of the harder phase from a surface of the slider body in FIG. 3A.
Figure 4B:
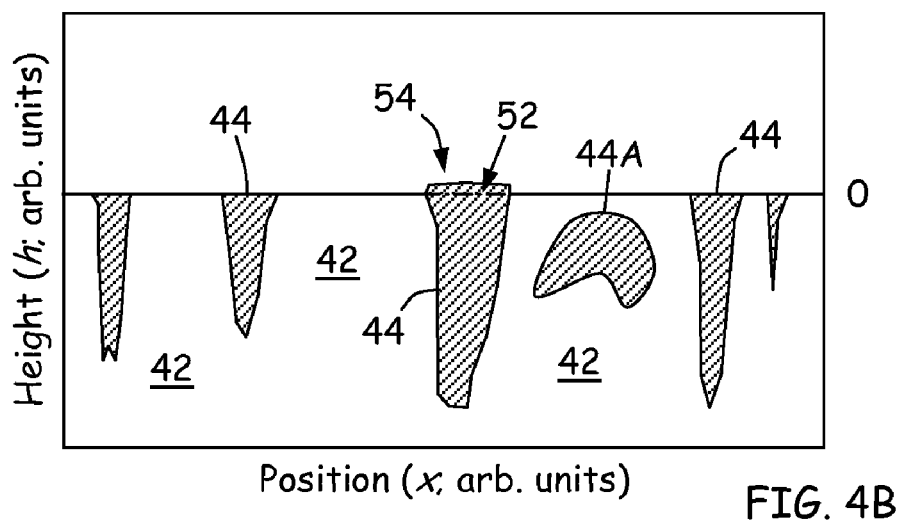
FIG. 4B is a one-dimensional plot taken along the surface in FIG. 4A, before removal of the harder phase.
Figure 4C:
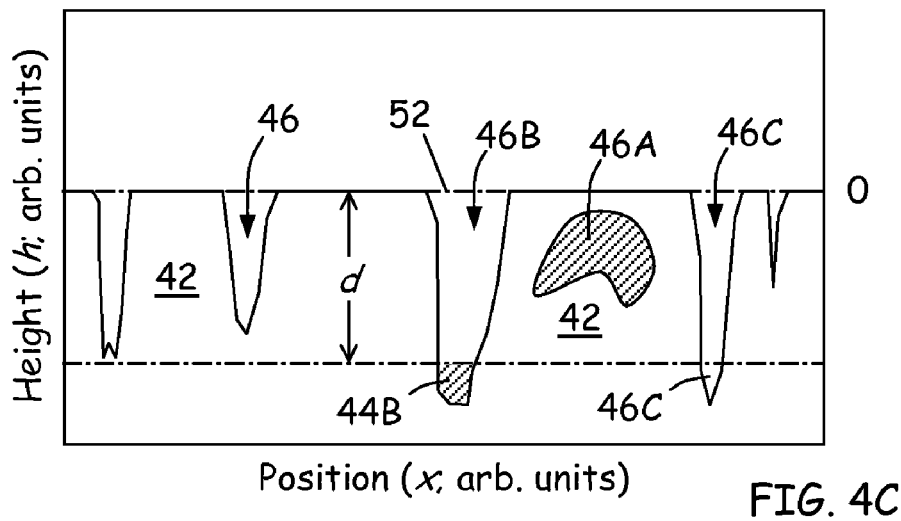
FIG. 4C is a one-dimensional plot taken along the selected surface in FIG. 4A, after removal of the harder phase.

FIG. 4A is a two-dimensional view of selected surface 51 on slider body 30, where surface 51 is selected for removal of included phase (hard component) 44. FIGS. 4B and 4C are one-dimensional plots taken along the surface in FIG. 4A, before and after selective removal of the hard component.

Selected surface 51 is defined within a contact region or other area prone to slider-media contact, typically along a leading edge surface, a media-facing surface, or both, as described above and as shown in FIGS. 5A and 5B below. Surface height h is plotted on the vertical axis of FIGS. 4B and 4C, with position x along horizontal scan line 52. Both height h and position x are given in arbitrary units.

FIGS. 4B and 4C define one-dimensional profiles of the two-dimensional surface in FIG. 4A, as obtained, for example, by atomic force microscopy (AFM) or analogous technique. Position x is defined along scan line 52 in FIG. 4A, and height h is defined with respect to selected surface 51. Scan line 52 is typically oriented in a track-wise direction, but in other scans the direction is cross-track, skewed or arbitrary.

The nominal or average height of selected surface 51 is defined at h=0, such that voids 46 form negative-height features (h<0) where included phase 44 is selectively removed, leaving host phase (soft component) 42. After selective removal, at least the exposed portions of included phase 44 are recessed to minimum depth d below nominal height h=0, as shown with respect to scan line (or nominal surface line) 52. Selective removal also eliminates protrusions 54, which are preferentially formed by included phase 44 because this is the harder component, and is more difficult to remove in polishing, lapping, burnishing and other manufacturing steps.

As described above, the depth and degree of selective removal depend upon etching or other selective removal technique. In some cases, for example, only the exposed potions of included phase 44 are removed, leaving unexposed inclusions 44A within depth d of selected surface 51. Additionally, included phase 44 is sometimes removed only within minimum depth d, forming partial void 46A above depth d and leaving at least some residual inclusion 44B below depth d. Alternatively, included phase 44 is entirely removed, forming complete void 46C both above and below etching depth d.

Removal of hard component 42 reduces both the hardness and the plasticity index of the contact region along selected surface 51. Plasticity index ψ is a dimensionless quantity defining the plastic properties of a surface or interface:

$$\psi = \frac{E}{H}\sqrt{\frac{R_q}{R}},\qquad [1]$$

where E is Young's modulus, H is the hardness, $R_q$ is the surface roughness or rms (root-mean-square) height, and R is the asperity radius (that is, the radius of curvature of asperity summits or protrusions), as defined along selected surface 51.

Because protrusions are preferentially formed by the included phase, selective removal tends to reduce not only hardness H but also surface roughness $R_q$ and asperity radius R, as compared to the corresponding values before etching. In some embodiments, for example, selective removal of the included phase reduces surface roughness $R_q$ to a value of about 1 nm or less (that is, $R_q \leq 10^{-9}$ m), with asperity radius R having a value between about one and two microns (1 μm ≤ R ≤ 2 μm). Correspondingly, plasticity index ψ is reduced to a value of less than two (ψ ≤ 2). In one particular embodiment, asperity radius R is reduced to about 1600 nm (R ≈ 1.6 μm), and plasticity index ψ is reduced to a value of about 1.55 (that is, ψ ≈ 1.6).

In alternate embodiments, where plasticity index ψ is reduced to approximately one, elastic deformation occurs along the selected surface or contact region. In these embodiments, slider-media contact events do not necessarily cause plastic deformation of the medium itself, further reducing the potential for the slider body to cause medium damage.

Figure 5A:
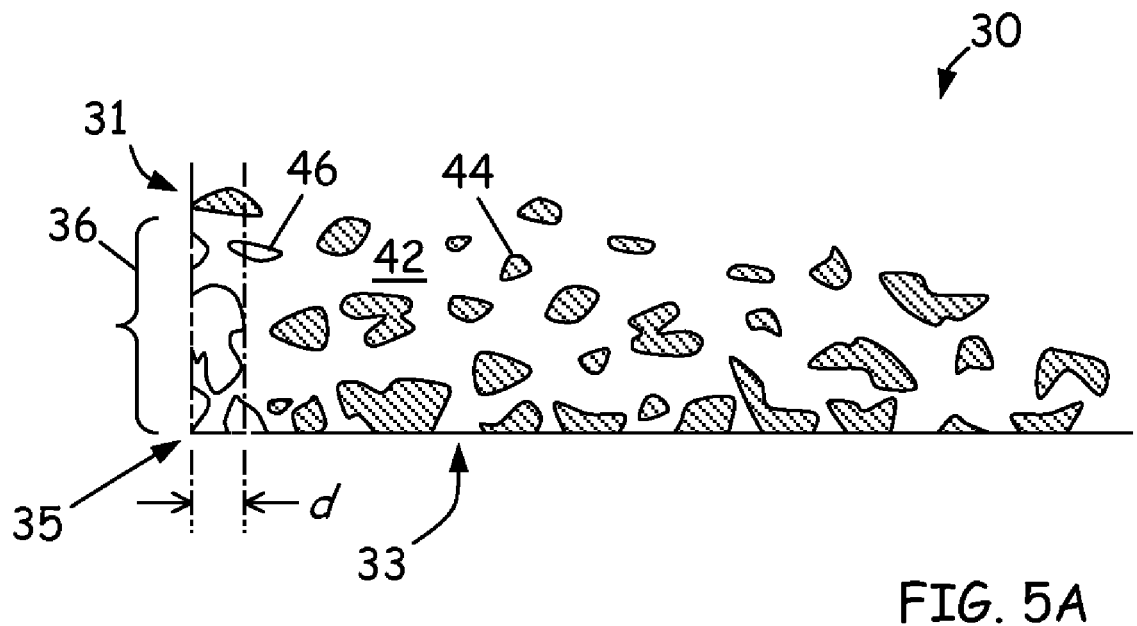
FIG. 5A is a cross-sectional view of the slider body in FIG. 2A, in an embodiment with a sharp corner interface between the leading edge and the media-facing surface.
Figure 5B:
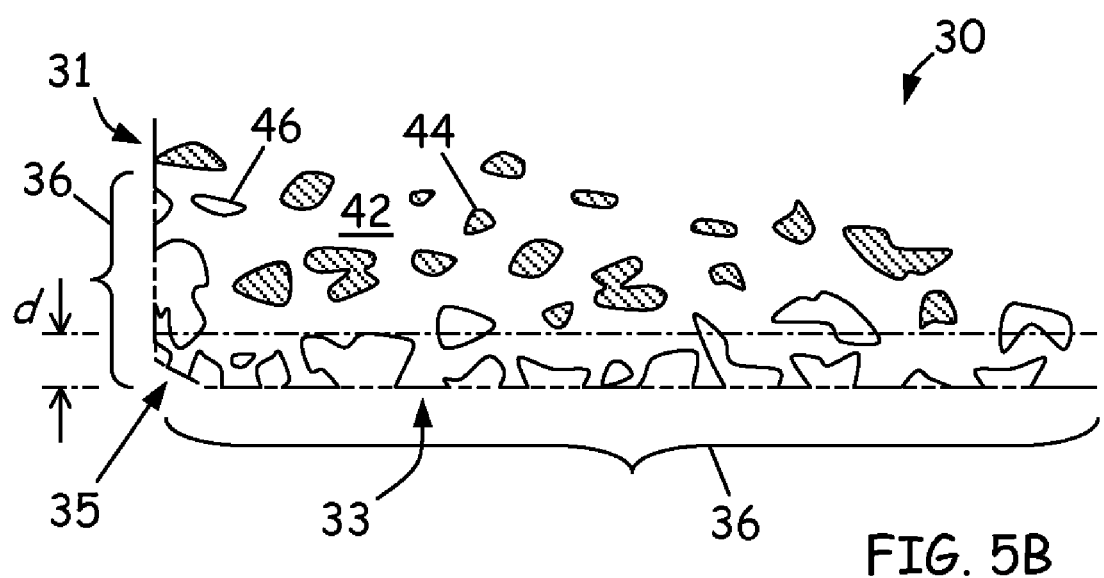
FIG. 5B is a cross-sectional view of the slider body in FIG. 2A, in an embodiment with a tapered corner interface between the leading edge and the media-facing surface.

FIGS. 5A and 5B are cross-sectional views of slider body 30, illustrating the recession of hard component (included phase) 44 from selected surfaces of contact region 36. In FIG. 5A interface 35 between leading edge 31 and media-facing surface 33 is sharply cornered, and in FIG. 5B interface 35 is tapered.

Contact region 36 typically extends from corner interface 35 along at least one of leading edge surface 31 and media-facing surface 33, with a particular size and shape that depend upon the various masking, etching, milling, burnishing and other techniques used to form slider body 30. As shown in FIG. 5A, for example, contact region 36 is located primarily along leading edge surface 31 of slider body 30, such that hard component (included phase) 44 is selectively removed from a region that extends transversely from media-facing surface 33 at corner interface 35. In some of these embodiments, contact region 36 extends along only a portion of leading edge surface 31, as show in FIG. 5A, and in other embodiments contact region 36 extends along substantially all of leading edge surface 31.

In the embodiment of FIG. 5A, contact region 36 includes corner interface 35, such that hard component 44 is also removed for at least minimum etching depth d along media-facing surface 33. Etching depth d is typically small as compared to the dimensions of slider body 30, however, and hard component 44 is not removed from the other (unselected) surfaces. Thus hard component 44 remains exposed along the substantially portion of media-facing surface 33.

In the embodiment of FIG. 5B, on the other hand, contact region 36 extends across corner interface 35 and along media-facing surface 33, transverse to leading edge surface 31. As a result, hard component 44 is selectively removed not only from part or all of leading edge surface 31, but also from part or all of media-facing surface 33.

Alternatively, contact region 36 extends only along media-facing surface 33. In these embodiments, hard component 44 remains exposed along the substantially portion of leading edge surface 3 1, or at least in the region outside corner interface 35, where the corner region is defined within minimum etching depth d of leading edge surface 31 and media-facing surface 33.

In the sharply cornered embodiment of FIG. 5A, slider body 30 is formed with a substantially sharp and approximately perpendicular corner interface 35 (that is, unburnished, untapered and unrounded), as defined between leading edge surface 31 and media-facing surface 33. In this embodiment, corner interface 35 is shaped to sweep particles and contaminants away from media-facing surface 33, in order to prevent damage from hard particles propagating between slider body 14 and the data storage medium, while retaining the advantages of reduced hardness and plasticity index in contact region 36.

In the tapered embodiment of FIG. 5B, slider body 30 is formed into a tapered, rounded or chamfered (that is, not perpendicular) corner interface 35 between leading edge surface 31 and media-facing surface 33, for example by milling, polishing or burnishing. In this embodiment, corner interface 35 is shaped to reduce contact forces in contact region 36, reducing damage to both the data storage medium and slider body 30 by spreading impact energy over a larger area, and by reducing contact pressure and local stress and strain effects.

In both the sharply cornered embodiment of FIG. 5A and the tapered embodiment of FIG. 5B, selective removal of hard component 44 from slider body 30 achieves reduced hardness and plasticity index without the use of coatings or other additional materials in contact area 36. As a result, slider body 30 reduces the risk of damage related to L/UL operations and other slider-media contact events, increasing reliability and service life without requiring the additional manufacturing steps and processing costs of other slider body designs.

While this invention has been described with reference to particular embodiments, the terminology used is for the purposes of description, not limitation. Workers skilled in the art will recognize that changes may be made in form and detail without departing from the spirit and scope of the invention, including the substitution of various equivalents for particular invention elements and adaptations of the invention's teachings to different materials, situations and circumstances. Thus the invention is not limited to the particular embodiments disclosed herein, but encompasses all embodiments falling within the scope of the appended claims.

The invention claimed is:

1. A slider comprising:
a two-phase material having a first component and a second component, wherein the second component is harder than the first component;
a media-facing surface formed on the two-phase material; and
a leading edge extending transversely from the media-facing surface;
wherein the second component is selectively removed from the two-phase material in a contact region located along at least one of the media-facing surface and the leading edge, such that a hardness of the slider is reduced in the contact region.

2. The slider of claim 1, wherein the hardness of the slider is less than about 25 GPa in the contact region.

3. The slider of claim 1, wherein the slider is uncoated in the contact region.

4. The slider of claim 3, wherein the slider has a plasticity index of less than 2 in the contact region.

5. The slider of claim 1, wherein the first component has a first component hardness that is less than 25 GPa and the second component has a second component hardness that is greater than 25 GPa.

6. The slider of claim 5, wherein the first component comprises aluminum oxide and the second component comprises titanium carbide.

7. The slider of claim 1, wherein the contact region extends transversely from the media-facing surface for at least 50 nm along the leading edge.

8. The slider of claim 1, wherein the contact region extends transversely from the leading edge for at least 50 nm along the media-facing surface.

9. The slider of claim 1, wherein the leading edge forms a sharp corner at the media-facing surface.

10. The slider of claim 1, wherein the leading edge forms a taper at the media-facing surface.

11. A magnetic head comprising:
a slider body formed of a two-phase material comprising a host phase and an included phase;
a media-facing surface formed on the slider body;
a leading edge surface extending transversely from the media-facing surface;
a trailing edge surface extending transversely from the media-facing surface, opposite the leading edge surface; and
a magnetic transducer formed on the trailing edge surface;
wherein exposed portions of the included phase are absent within a depth of at least 5 nm in a region extending transversely from the media-facing surface along the leading edge surface.

12. The magnetic head of claim 11, wherein the host phase comprises aluminum oxide and the included phase comprises titanium carbide.

13. The magnetic head of claim 12, wherein the slider body has a plasticity index of less than 5 and a hardness of less than 25 GPa in the region where the exposed portions of the included phase are absent.

14. The magnetic head of claim 11, wherein the exposed portions of the included phase are absent for at least 50 nm along the leading edge.

15. The magnetic head of claim 11, wherein the exposed portions of the included phase are absent for at least 50 nm along the media-facing surface.

* * * * *